(12) United States Patent
Kume et al.

(10) Patent No.: US 7,597,773 B2
(45) Date of Patent: Oct. 6, 2009

(54) PRODUCING METHOD OF LAMINATED FILTER

(75) Inventors: Kouji Kume, Chita-gun (JP); Yoshihisa Sanami, Obu (JP)

(73) Assignee: Toyota Boshoku Kabushiki Kaisha, Kariya (JP)

( * ) Notice: Subject to any disclaimer, the term of this patent is extended or adjusted under 35 U.S.C. 154(b) by 342 days.

(21) Appl. No.: 11/597,993

(22) PCT Filed: Jun. 1, 2005

(86) PCT No.: PCT/JP2005/010449

§ 371 (c)(1),
(2), (4) Date: Nov. 30, 2006

(87) PCT Pub. No.: WO2005/118107

PCT Pub. Date: Dec. 15, 2005

(65) Prior Publication Data

US 2008/0017299 A1 Jan. 24, 2008

(30) Foreign Application Priority Data

Jun. 3, 2004 (JP) ............................ 2004-165896

(51) Int. Cl.
  *B01D 39/16* (2006.01)
(52) U.S. Cl. ..................... 156/205; 156/206; 156/201; 156/208; 156/462; 210/493.1; 210/493.5; 55/485; 55/521

(58) Field of Classification Search ............. 156/206, 156/208, 201, 205, 462; 210/493.1, 493.5; 55/485, 521
See application file for complete search history.

(56) References Cited

U.S. PATENT DOCUMENTS 3,531,920 A * 10/1970 Hart ............................ 55/497
4,268,290 A    5/1981 Barrington
5,089,202 A * 2/1992 Lippold ....................... 264/145

FOREIGN PATENT DOCUMENTS

| DE | 198 40 231 A1 | 3/2000 |
| JP | A 55-18293 | 2/1980 |
| JP | A 64-18414 | 1/1989 |
| JP | A 5-285326 | 11/1993 |
| JP | A 11-290624 | 10/1999 |

\* cited by examiner

*Primary Examiner*—Richard Crispino
*Assistant Examiner*—Jaeyun Lee
(74) *Attorney, Agent, or Firm*—Oliff & Berridge, PLC (57) ABSTRACT

The present invention relates to a producing method of a laminated filter that carries out a corrugating operation and an adhering operation of filter media in the same step. A corrugation forming apparatus (20) sandwiches first and second filter media (12, 14) in their superposed state, and heats and presses the first and second filter media (12, 14) at the softening temperature of the second filter medium (14) to corrugate the filter media (12, 14), and thermally adheres the first and second filter media (12, 14) to each other. With this, it is possible to carry out the corrugating operation and the adhering operation of the first and second filter media (12, 14) in the same step.

5 Claims, 9 Drawing Sheets

PRODUCING METHOD OF LAMINATED FILTER

TECHNICAL FIELD

The present invention relates to a producing method of a laminated filter having laminated filter media.

BACKGROUND ART

In a filter, filter media are subject to corrugation forming to prevent their corrugations (pleats) from being brought into intimate contact with each other in some cases (e.g., Japanese Patent Applications Laid-Open Nos. 55-18293 and 5-285326). When such filter media are laminated on and adhered to each other, various methods can be used (e.g., Japanese Patent Applications Laid-Open No. 11-290624).

However, when plural filter media are corrugation-formed and adhered to each other, a step of corrugation forming and a step of adhering them to each other have been carried out as separate steps.

DISCLOSURE OF THE INVENTION

In view of the above circumstances, the present invention provides a producing method of a laminated filter in which a corrugation forming operation and an adhering operation of filter media are carried out in the same step.

According to the producing method of a laminated filter of the present invention, a corrugation forming apparatus sandwiches plural filter media in a state in which the filter media are superposed on each other, the corrugation forming apparatus heats and presses the filter media at a softening temperature of at least one of the plural filter media, thereby corrugation-forming the filter media, and the filter media are thermally adhered to each other.

According to the producing method of a laminated filter of the present invention, the corrugation forming apparatus sandwiches the plural filter media in the state in which the filter media are superposed on each other, the corrugation forming apparatus heats and presses the filter media at the softening temperature of at least one of the plural filter media, thereby corrugation-forming the filter media, and the filter media can be thermally adhered to each other. The corrugation forming apparatus heats and presses the filter media at the softening temperature of at least one of the filter media in this manner and with this, the filter media can be formed into the corrugated shape, the filter media are brought into the softened state and can be thermally adhered to each other in one step. Therefore, the number of steps can be reduced.

Further, in the present invention, preferably, temperature of at least one of patterning portions of the corrugation forming apparatus is set to the lowest one of softening temperatures of the plural filter media.

Thus, according to the producing method of a laminated filter of the present invention, since the temperature of at least one of the patterning portions of the corrugation forming apparatus is set equal to the lowest one of softening temperatures of the plural filter media, it is possible to prevent any of the filter media from melting and loosing its fiber shape, and the deterioration of the filtering performance of the produced laminated filter can be suppressed.

BEST MODE FOR CARRYING OUT THE INVENTION

A first embodiment of a producing method of a laminated filter according to the present invention will be explained based on the drawings.

Figure 1:
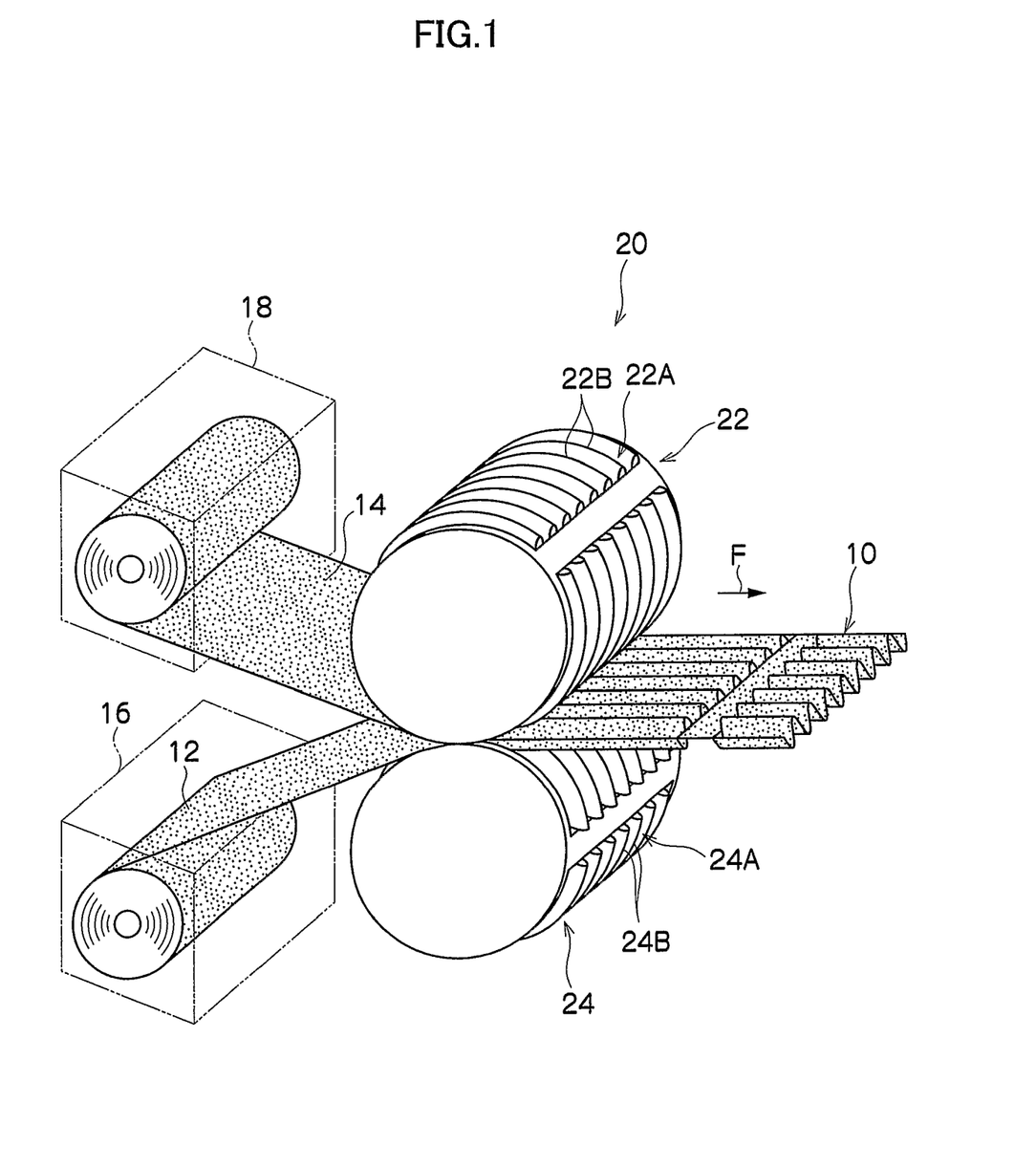
FIG. 1 is a perspective view showing a producing method of a laminated filter according to a first embodiment.

As shown in FIG. 1, a laminated filter 10 includes as materials, a first filter medium 12 as a main body, and a second filter medium 14 laminated on the first filter medium 12. The second filter medium 14 includes thermoplastic resin such as polypropylene (PP) resin and the like, and woven fabric or nonwoven fabric is suitably employed. The nonwoven fabric may appropriately be produced using a known method. For example, a melt blown method, a spun-bonding method or the like may be employed. The first filter medium 12 preferably has air permeability, but when the first filter medium 12 includes thermoplastic resin, the melting point of the thermoplastic resin of the first filter medium 12 should be higher than that of thermoplastic resin included in the second filter medium 14.

The first filter medium 12 and the second filter medium 14 are formed into a long band-like shape and are wound up in a roll, and are sent to a production line of the laminated filter 10. In the production line of the laminated filter 10, the first filter medium 12 and the second filter medium 14 are mounted in a first send-out section 16 and a second send-out section 18, respectively, and are rotatably supported therein.

A corrugation forming apparatus 20 is disposed downstream of the first send-out section 16 and the second send-out section 18. The corrugation forming apparatus 20 is provided with a pair of upper corrugated roll 22 and lower corrugated roll 24. The upper corrugated roll 22 is disposed above the lower corrugated roll 24 such that their axes are in parallel to each other. A roll surface 22A of the upper corrugated roll 22 and a roll surface 24A of the lower corrugated roll 24 are formed with plural peaks 22B and 24B (see FIGS. 2A and 2B) and valleys 22C and 24C (see FIGS. 2A and 2B) extending in the circumferential direction. The upper corrugated roll 22 and the lower corrugated roll 24 receive torques from respective roll driving sections (not shown) and rotate at equal linear speed.

Figure 2A:
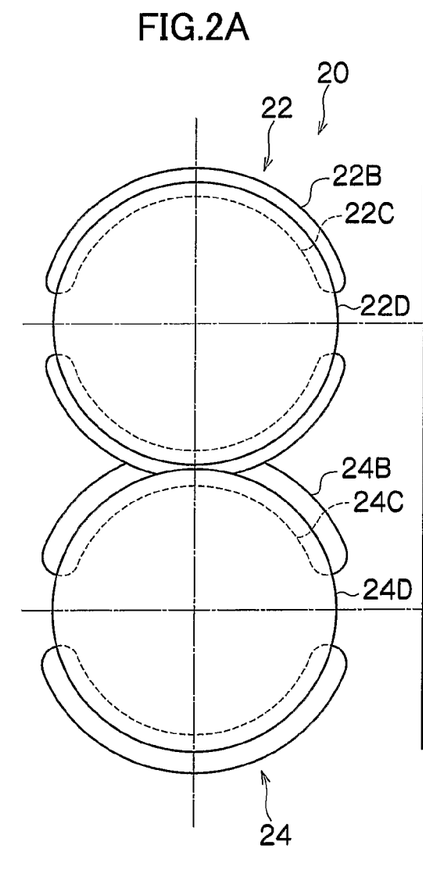
FIG. 2A is a front view of a corrugation forming apparatus used in the first embodiment.
Figure 2B:
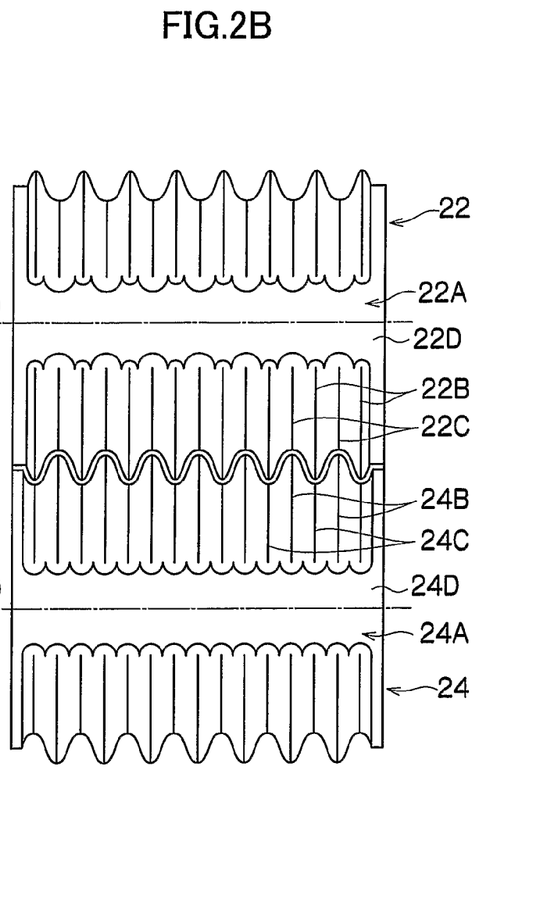
FIG. 2B is a side view of the corrugation forming apparatus used in the first embodiment.

As shown in FIG. 2B, if the roll surface 22A of the upper corrugated roll 22 is viewed from its radial direction, top lines (ridgelines) of the peaks 22B and valley bottom lines of the valleys 22C are arranged at equal distances from one another in parallel to a direction which intersects at right angle with an axial direction of the upper corrugated roll 22. If the roll surface 24A of the lower corrugated roll 24 is viewed from its radial direction, the top lines (ridgelines) of the peaks 24B and the valley bottom lines of the valleys 24C are arranged at equal distances from one another in parallel to a direction which intersects at right angle with an axial direction of the lower corrugated roll 24. The peaks 22B of the upper corrugated roll 22 are opposed to the valleys 24C of the lower corrugated roll 24, and the peaks 24B of the lower corrugated roll 24 are opposed to the valleys 22C of the upper corrugated roll 22. The projecting length of the peaks 22B of the upper corrugated roll 22 is substantially equal to the recessed size of the valleys 24C of the lower corrugated roll 24, and the projecting length of the peaks 24B of the lower corrugated roll 24 is substantially equal to the recessed size of the valleys 22C of the upper corrugated roll 22.

As shown in FIG. 2A, a corrugated portion formed by the peaks 22B and 24B and the valleys 22C and 24C is divided into two blocks in the circumferential direction, and a length of one block in the circumferential direction is slightly shorter than ½ of the circumference. Between these two blocks, there are smooth curved portions 22D and 24D. The curved portions 22D and 24D are curved surfaces having constant radii from axes of the upper corrugated roll 22 and the lower corrugated roll 24, respectively. The corrugated portion may be divided into two or more blocks in the circumferential direction.

The upper corrugated roll 22 and the lower corrugated roll 24 shown in FIG. 1 are heated from inside by a heating means (not shown). The temperatures of the upper corrugated roll 22 and the lower corrugated roll 24 are set to the melting point of the second filter medium 14 (e.g., 120° C. to 130° C.) or less, and to the softening temperature of the second filter medium 14 (e.g., 100° C.). Note that, the softening temperature would be lower than the melting point about by 15 to 35° C.

The upper corrugated roll 22 and the lower corrugated roll 24 are biased by biasing mechanisms (not shown) respectively receiving bias forces toward the lower corrugated roll 24 and the upper corrugated roll 22, i.e., in such a direction that the upper corrugated roll 22 and the lower corrugated roll 24 approach each other. With this, the first filter medium 12 and the second filter medium 14 are heated and pushed (compressed) between the roll surface 22A of the upper corrugated roll 22 and the roll surface 24A of the lower corrugated roll 24 and in this state, the first filter medium 12 and the second filter medium 14 are transferred at constant speed by a transferring force from the upper corrugated roll 22 and the lower corrugated roll 24 in the transfer direction (in the arrow F direction). The laminated filter 10 sent from the corrugation forming apparatus 20 is corrugation-formed, and the first filter medium 12 and the second filter medium 14 are adhered to each other and become laminated state (two layers).

Figure 3A:
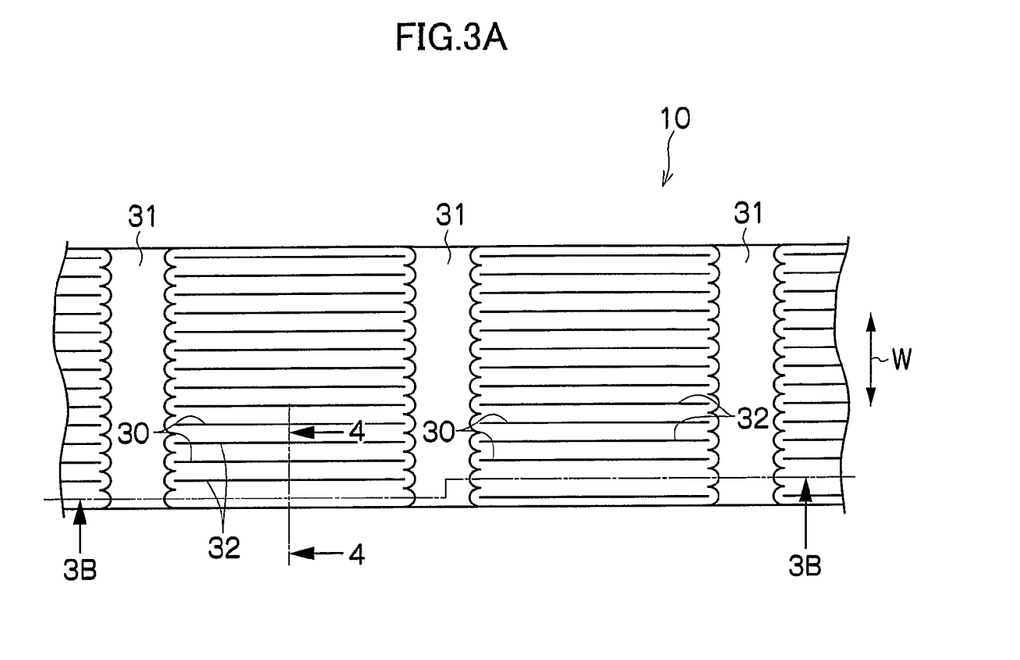
FIG. 3A is a plan view of a laminated filter produced according to the first embodiment.
Figure 3B:
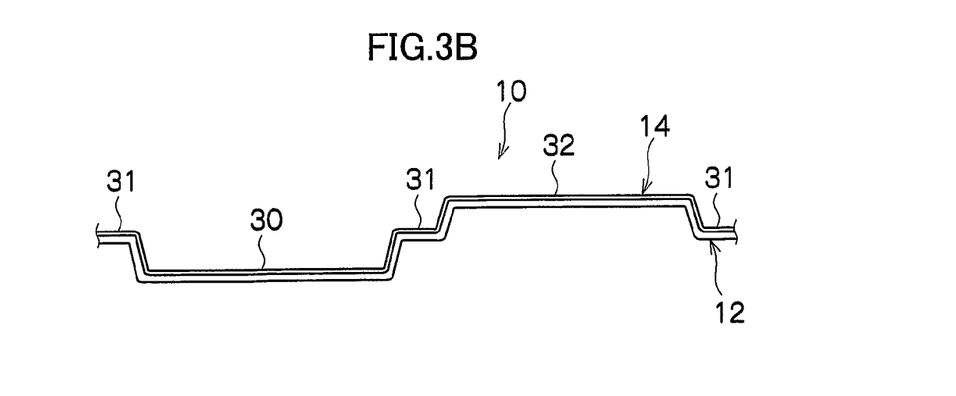
FIG. 3B is a sectional view taken along the line 3B-3B in FIG. 3A.
Figure 4:
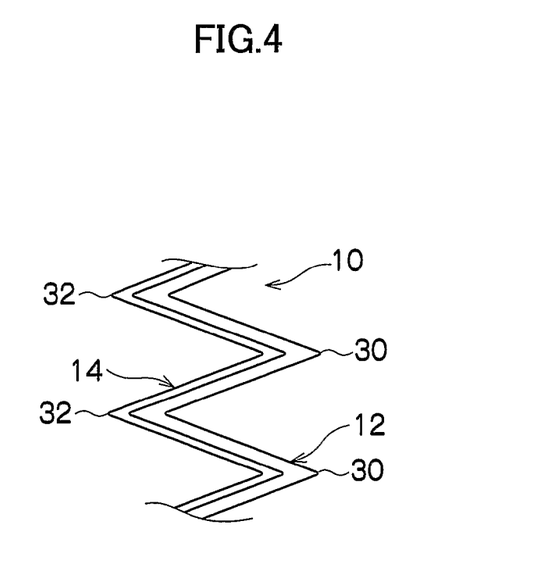
FIG. 4 is an enlarged sectional view taken along the line 4-4 in FIG. 3A.

FIGS. 3A, 3B and 4 show the laminated filter 10 sent from the corrugation forming apparatus 20. As shown in FIGS. 3A and 3B, the laminated filter 10 is formed with bent bottoms 30 which are bent in a concave form as viewed from the second filter medium 14, and bent crests 32 which are bent in a convex form as viewed from the second filter medium 14. The bent bottoms 30 and the bent crests 32 are alternately formed in the widthwise direction (in the arrow W direction) of the laminated filter 10. The valley bottom lines of the bent bottoms 30 and the top lines (ridgelines) of the bent crests 32 extend in parallel to the longitudinal direction of the band-like laminated filter 10, and a distance therebetween is constant. The first filter medium 12 and the second filter medium 14 are thermally adhered to each other at the bent bottoms 30 and the bent crests 32. Flat portions 31 are intermittently formed on the band-like laminated filter 10 at a predetermined distance from each other in the longitudinal direction.

Next, a processing procedure of the producing method of the laminated filter will be explained.

First, the first filter medium 12 mounted in the first send-out section 16 and the second filter medium 14 mounted in the second send-out section 18, which are shown in FIG. 1, are sent from the first send-out section 16 and the second send-out section 18 to the corrugation forming apparatus 20, respectively.

The upper corrugated roll 22 and the lower corrugated roll 24 of the corrugation forming apparatus 20 sandwich the first filter medium 12 and the second filter medium 14 in their superposed state. The upper corrugated roll 22 and the lower corrugated roll 24 rotate at equal liner speed, and send the first filter medium 12 and the second filter medium 14 toward downstream as the laminated filter 10. At that time, the upper corrugated roll 22 and the lower corrugated roll 24 are heated to the softening temperature of the second filter medium 14 by the heating means (not shown), and are biased by the biasing mechanisms (not shown). Therefore, the first filter medium 12 and the second filter medium 14 are heated and pressed between the roll surface 22A of the upper corrugated roll 22 and the roll surface 24A of the lower corrugated roll 24, and are transferred in the transfer direction (the arrow F direction) at constant speed by the transferring force from the upper corrugated roll 22 and the lower corrugated roll 24. During the transfer by the upper corrugated roll 22 and the lower corrugated roll 24, the lower corrugated roll 24 brings its roll surface 24A into contact with a surface of the first filter medium 12 under pressure, and the upper corrugated roll 22 brings its roll surface 22A into contact with a surface of the second filter medium 14 under pressure, thereby forming the first filter medium 12 and the second filter medium 14 into the corrugated shape.

Figure 5:
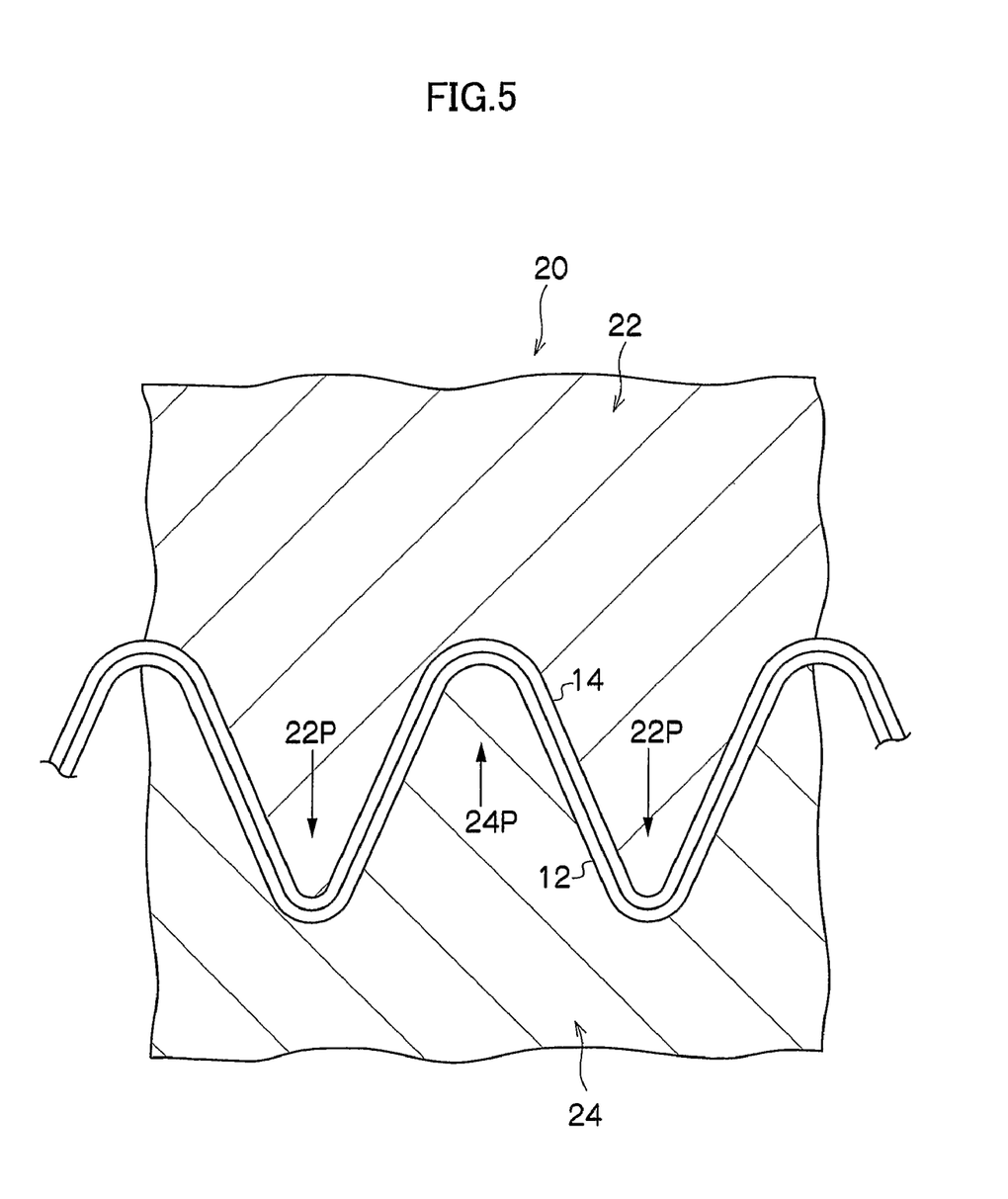
FIG. 5 is a schematic enlarged sectional view showing a state in which first and second filter media pass between upper and lower corrugated rolls.

FIG. 5 shows a state when the first filter medium 12 and the second filter medium 14 pass between the upper corrugated roll 22 and the lower corrugated roll 24 in an enlarged scale. As shown in FIG. 5, the first filter medium 12 and the second filter medium 14 are sandwiched between the upper corrugated roll 22 and the lower corrugated roll 24, and pressed and crushed by the pressing forces 22P and 24P. At that time, the upper corrugated roll 22 and the lower corrugated roll 24 are heated to the temperature equal to or lower than the melting point of the second filter medium 14 (e.g., 120° C. to 130° C.) at which the second filter medium 14 is brought into the softened state (e.g., 100° C.). Thus, the second filter medium 14 is softened. With this, the second filter medium 14 is pressed against the first filter medium 12 whose weaving structure is crushed by the pressing pressure and in which distances between the mesh are enlarged (mesh is opened), and constituent fibers of the softened second filter medium 14 are entangled with constituent fibers of the first filter medium 12 and are thermally adhered thereto.

The corrugation forming apparatus 20 heats and presses the first filter medium 12 and the second filter medium 14 at the softening temperature of the second filter medium 14 in this manner and with this, the first filter medium 12 and the second filter medium 14 can be formed into the corrugated shape, the first filter medium 12 and the second filter medium 14 are brought into the softened state and can be thermally adhered to each other in one step. Therefore, the number of steps can be reduced. The constituent fibers of the second filter medium 14 are softened and the second filter medium 14 is thermally adhered to the first filter medium 12 without melting the second filter medium 14. Thus, the first filter medium 12 can be finely divided without closing the vents (gaps) between its constituent fibers, and the deterioration of the filtering performance can be suppressed. The filter medium performance of the produced laminated filter 10 is good as compared with a case in which filter media are adhered to each other in advance.

When the first filter medium 12 includes thermoplastic resin, its melting point is set higher than a melting point of thermoplastic resin included in the second filter medium 14 (e.g., 120° C. to 130° C.). With this, it is possible to prevent the first filter medium 12 from melting and loosing its fiber shape. With this, it is possible to prevent the filtering performance of the laminated filter 10 from being deteriorated. Here, it is preferable that a difference between the melting point of the first filter medium 12 and the melting point of the second filter medium 14 is 10° C. or more. If the difference between the melting points is set to 10° C. or more, only the second filter medium 14 is softened at the time of heating and pressing by the upper corrugated roll 22 and the lower corrugated roll 24, and it is possible to largely suppress the deterioration of the filtering performance of the laminated filter 10.

When the laminated filter 10 produced in this manner is used, the flat portions 31 shown in FIGS. 3A and 3B are alternately frilly folded in a zigzag manner in a direction intersecting at right angle with the ridgeline direction of the bent bottoms 30 and the bent crests 32, and the laminated filter 10 is used as a filter element which cleans air sucked by an engine for example.

Next, a second embodiment of the producing method of a laminated filter will be explained based on FIGS. 6A and 6B. In the second embodiment, laminated filter bending convex portions 23A are formed on an upper corrugated roll 22, and laminated filter bending concave portions 25A are formed on a lower corrugated roll 24. Other structure is substantially the same as that of the first embodiment and thus, the same elements are designated with the same symbols and an explanation thereof will be omitted.

Figure 6A:
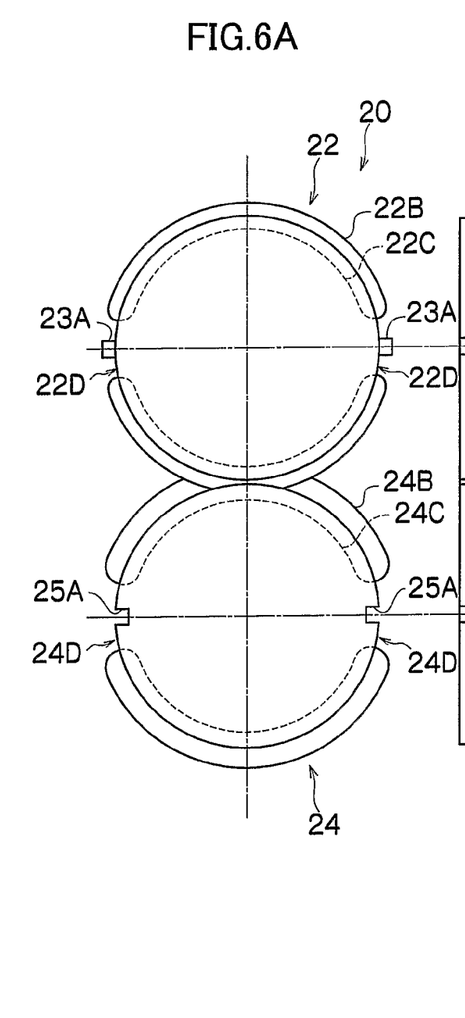
FIG. 6A is a front view of a corrugation forming apparatus used in a second embodiment.
Figure 6B:
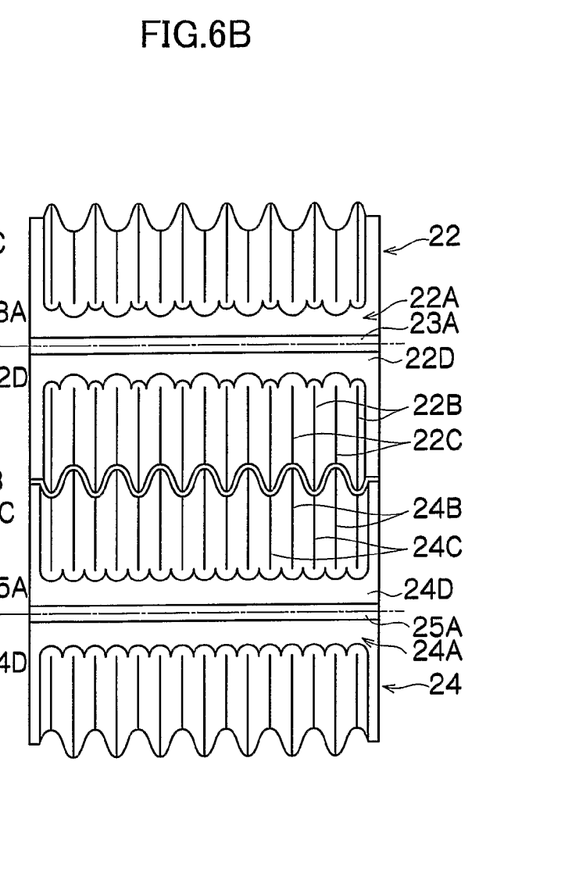
FIG. 6B is a side view of the corrugation forming apparatus used in the second embodiment.

As shown in FIGS. 6A and 6B, curved portions 22D of the upper corrugated roll 22 are formed with convex portions 23A which are a plate having a convex cross section extending in a direction intersecting at right angle with the circumferential direction in the form of a rib. Curved portions 24D of the lower corrugated roll 24 are formed with concave portions 25A having a concave cross section extending in a direction intersecting at right angle with the circumferential direction corresponding to the convex portions 23A in the form of a groove. The laminated filter produced by the corrugation forming apparatus 20 shown in FIGS. 6A and 6B can be formed with a bending stripe (crease), and at the same time, the first filter medium 12 and the second filter medium 14 shown in FIG. 1 can be thermally adhered to each other.

In the second embodiment, as shown in FIGS. 6A and 6B, the curved portions 22D of the upper corrugated roll 22 are formed with the convex portions 23A, and the curved portions 24D of the lower corrugated roll 24 are formed with the concave portions 25A corresponding to the convex portions 23A. Alternatively, the curved portions 24D of the lower corrugated roll 24 may be formed with the convex portions 23A, and the curved portions 22D of the upper corrugated roll 22 may be formed with the concave portions 25A corresponding to the convex portions 23A.

Further, one of sides (right side in FIG. 6A for example) of the curved portions 22D of the upper corrugated roll 22 may be formed with the convex portion 23A, and the other side (left side in FIG. 6A for example) may be formed with the concave portion 25A, and the one of sides (right side in FIG. 6A for example) of the curved portions 24D of the lower corrugated roll 24 may be formed with the concave portion 25A, and the other side (left side in FIG. 6A for example) may be formed with the convex portion 23A. In this case, the convex portion 23A of the upper corrugated roll 22 and the concave portion 25A of the lower corrugated roll 24 correspond to each other in position, and the concave portion 25A of the upper corrugated roll 22 and the convex portion 23A of the lower corrugated roll 24 correspond to each other in position. With this structure, concave and convex shapes of the bending stripes formed in the produced laminated filter are arranged alternately every flat portion 31 (see FIGS. 3A and 3B) and thus, the laminated filter can easily be folded in the frilly manner.

Next, a third embodiment of the producing method of a laminated filter will be explained based on FIGS. 7A and 7B. Curved portions 22D of an upper corrugated roll 22 of the third embodiment are formed with plural convex portions 23B. Other structure is substantially the same as that of the first embodiment and thus, the same elements are designated with the same symbols and an explanation thereof will be omitted.

Figure 7A:
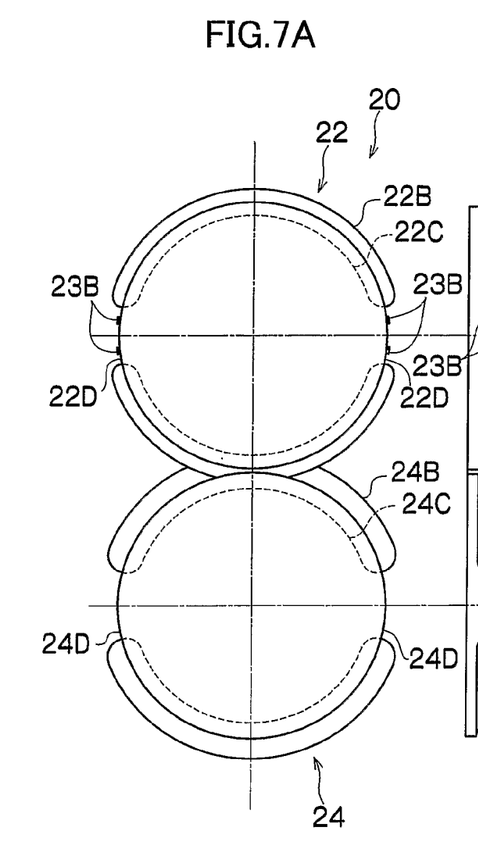
FIG. 7A is a front view of a corrugation forming apparatus used in a third embodiment.
Figure 7B:
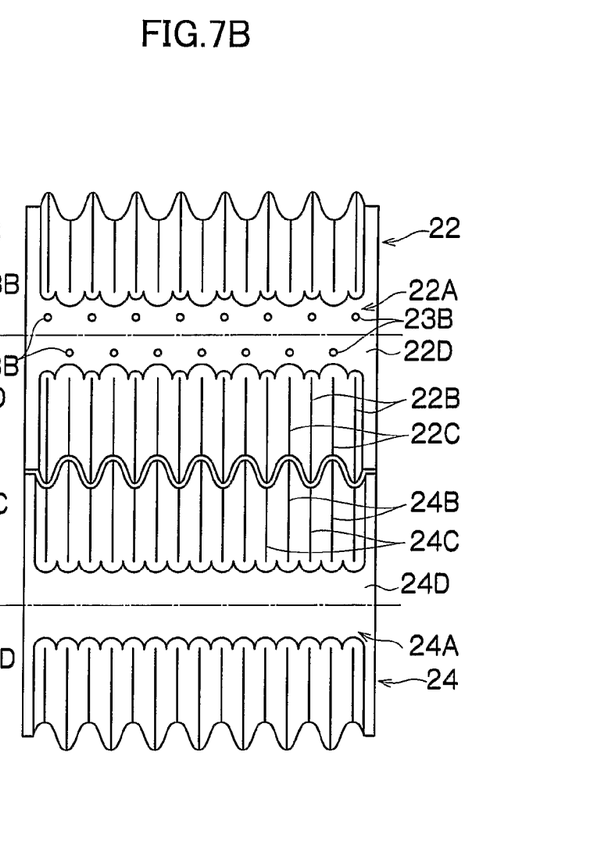
FIG. 7B is a side view of the corrugation forming apparatus used in the third embodiment.

As shown in FIGS. 7A and 7B, the curved portions 22D of the upper corrugated roll 22 are formed with an emboss pattern by plural convex portions 23B. The convex portions 23B have such a height that the convex portions 23B do not come into contact with a lower corrugated roll 24 when the upper corrugated roll 22 and the lower corrugated roll 24 idle (at the time of rotation in a state in which the upper corrugated roll 22 and the lower corrugated roll 24 do not sandwich the first filter medium 12 and the second filter medium 14). The first filter medium 12 and the second filter medium 14 shown in FIG. 1 are heated and pressed by the convex portions 23B, the constituent fibers of the softened second filter medium 14 entangle with the constituent fibers of the first filter medium 12 and they are thermally adhered to each other. Therefore, the adhesiveness between the first filter medium 12 and the second filter medium 14 can further be enhanced.

In the third embodiment, the curved portions 22D of the upper corrugated roll 22 shown in FIGS. 7A and 7B are formed with the plural convex portions 23B, but curved portions 24D of the lower corrugated roll 24 may be formed with the plural convex portions 23B alternatively.

Figure 8A:
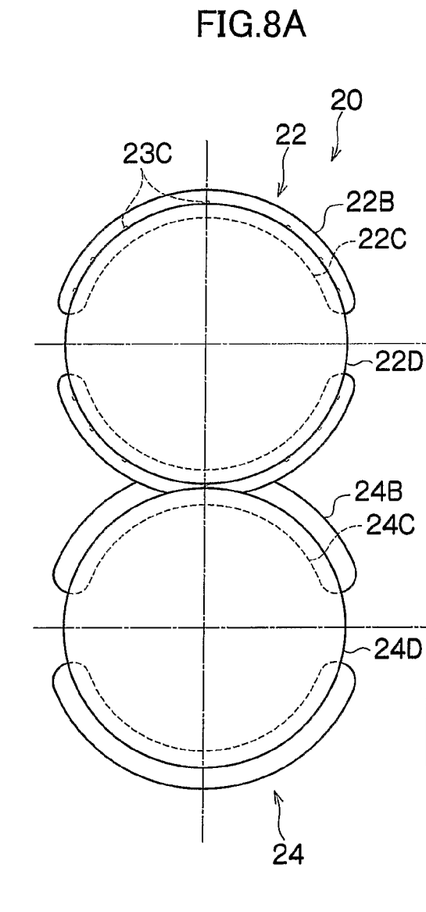
FIG. 8A is a front view of a corrugation forming apparatus used in a fourth embodiment.

Next, a fourth embodiment of the producing method of a laminated filter will be explained based on FIGS. 8A and 8B. In the fourth embodiment, an upper corrugated roll 22 and a lower corrugated roll 24 are respectively formed with flat portions 22E and 24E extending in the circumferential direction thereof, and the flat portions 22E of the upper corrugated roll 22 are formed with plural convex portions 23C. Other structure is substantially the same as that of the first embodiment and thus, the same elements are designated with the same symbols and an explanation thereof will be omitted.

Figure 8B:
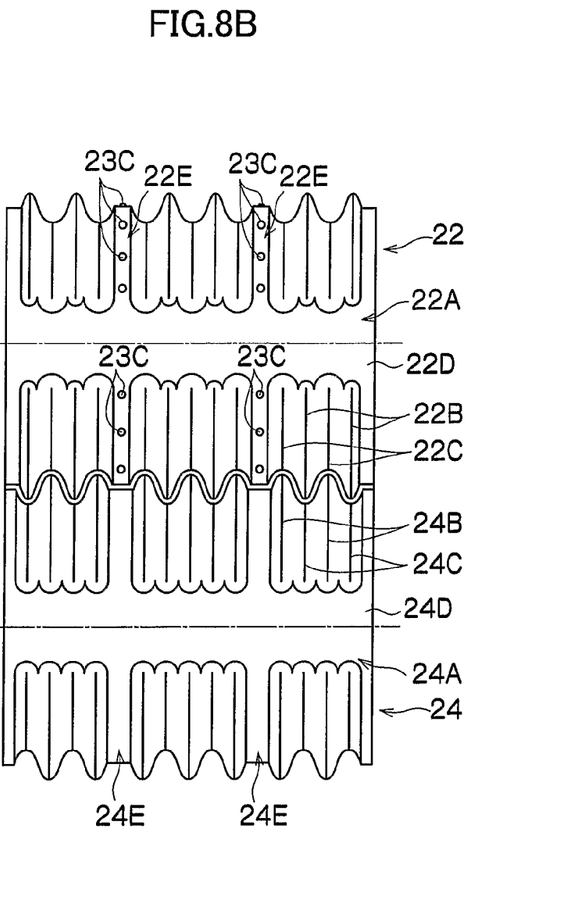
FIG. 8B is a side view of the corrugation forming apparatus used in the fourth embodiment.

As shown in FIG. 8B, the upper corrugated roll 22 and the lower corrugated roll 24 are formed with plural flat portions 22E and 24E extending in the circumferential direction, and a corrugated portion formed by the peaks 22B and 24B and the valleys 22C and 24C is divided into plural blocks. The flat portions 22E and 24E form a smooth surface with respect to the curved portions 22D and 24D. Each flat portion 22E of the upper corrugated roll 22 is formed with plural convex portions 23C arranged in one line in the circumferential direction. The convex portions 23C have such a height that the convex portions 23C do not come into contact with the lower corrugated roll 24 when the upper corrugated roll 22 and the lower corrugated roll 24 idle (at the time of rotation in a state in which the upper corrugated roll 22 and the lower corrugated roll 24 do not sandwich the first filter medium 12 and the second filter medium 14). The first filter medium 12 and the second filter medium 14 shown in FIG. 1 are heated and pressed by the convex portions 23C, the constituent fibers of the softened second filter medium 14 entangle with the constituent fibers of the first filter medium 12 and they are thermally adhered to each other. Therefore, the adhesiveness between the first filter medium 12 and the second filter medium 14 can further be enhanced.

In the fourth embodiment, the flat portions 22E of the upper corrugated roll 22 shown in FIG. 8B are formed with the plural convex portions 23C, but the flat portions 24E of the lower corrugated roll 24 may be formed with the plural convex portions 23C alternatively.

Next, a fifth embodiment of the producing method of a laminated filter will be explained based on FIGS. 9A and 9B. In the fifth embodiment, the upper corrugated roll 22 and the lower corrugated roll 24 are formed with flat portions 22E and 24E extending in the circumferential direction, and annular convex portions 23D extending in the form of a rib in the circumferential direction are formed in the central portion of the flat portions 22E and on the curved portion 22D of the upper corrugated roll 22. Other structure is substantially the same as that of the first embodiment and thus, the same elements are designated with the same symbols and an explanation thereof will be omitted.

Figure 9A:
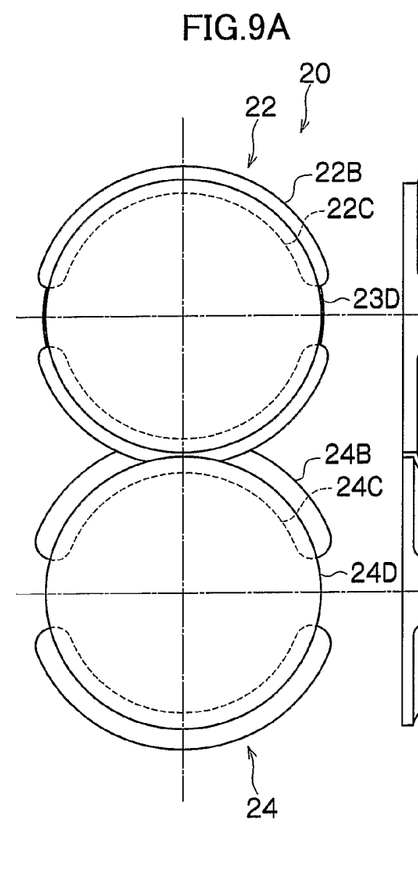
FIG. 9A is a front view of a corrugation forming apparatus used in a fifth embodiment.
Figure 9B:
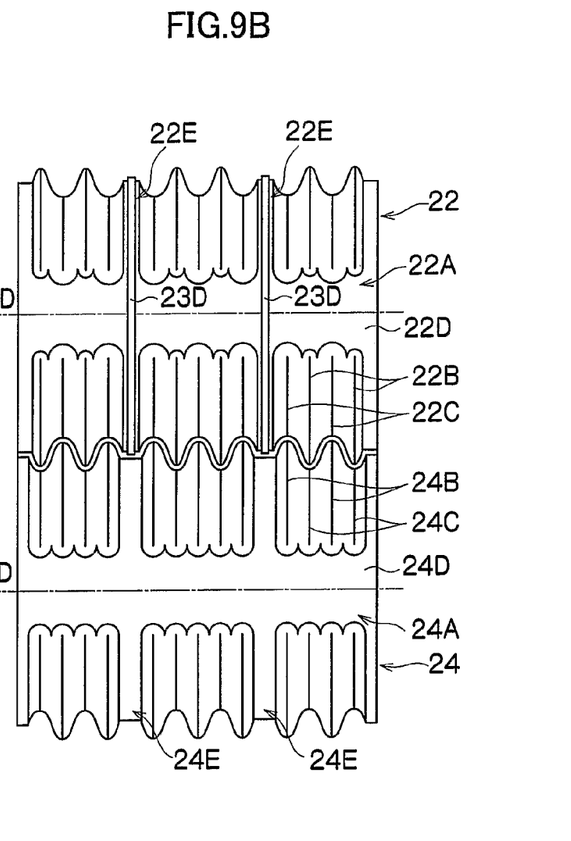
FIG. 9B is a side view of the corrugation forming apparatus used in the fifth embodiment.

As shown in FIG. 9B, the upper corrugated roll 22 and the lower corrugated roll 24 are formed with plural flat portions 22E and 24E extending in the circumferential direction, and a corrugated portion formed by the peaks 22B and 24B and the valleys 22C and 24C is divided into plural blocks. The flat portions 22E and 24E form a smooth surface with respect to the curved portions 22D and 24D. Each flat portion 22E of the upper corrugated roll 22 is formed with an annular convex portion 23D which is a plate having a convex cross section extending in the circumferential direction in the form of a rib in the central portion of the flat portions 22E. The annular convex portion 23D vertically extends across the curved portion 22D and goes round the roll surface 22A. The annular convex portions 23D have such a height that the annular convex portions 23D do not come into contact with the lower corrugated roll 24 when the upper corrugated roll 22 and the lower corrugated roll 24 idle (at the time of rotation in a state in which the upper corrugated roll 22 and the lower corrugated roll 24 do not sandwich the first filter medium 12 and the second filter medium 14). The first filter medium 12 and the second filter medium 14 shown in FIG. 1 are heated and pressed by the annular convex portions 23D, the constituent fibers of the softened second filter medium 14 entangle with the constituent fibers of the first filter medium 12 and they are thermally adhered to each other. Therefore, the adhesiveness between the first filter medium 12 and the second filter medium 14 can further be enhanced.

In the fifth embodiment, the upper corrugated roll 22 shown in FIGS. 9A and 9B is formed with the annular convex portions 23D, but the lower corrugated roll 24 may be formed with the annular convex portions 23D alternatively.

Note that, the shapes of the upper corrugated roll 22 and the lower corrugated roll 24 shown in the first to fifth embodiments may appropriately be combined and applied to the producing method of a laminated filter. The number of the elements (e.g., convex portions, concave portions and the like) is not limited to those shown in the embodiments.

Although both the upper corrugated roll 22 and the lower corrugated roll 24 are heated from inside by the heating means (not shown) in the embodiments, only one of the corrugated rolls may be heated from inside. In this case, it is preferable that the heating temperature is set to the softening temperature (e.g., 100° C.) of the second filter medium 14 which has a low softening temperature.

INDUSTRIAL APPLICABILITY

According to the producing method of a laminated filter of the present invention, as explained above, the corrugation-forming operation and the adhering operation of the filter media can be carried out in the same step.

The invention claimed is:

1. A producing method of a laminated filter wherein a corrugation forming apparatus sandwiches a plurality of filter media, the plurality of filter media including a first filter medium and a second filter medium, the first filter medium having a first thermoplastic resin including first constituent fibers and having a first melting temperature, and the second filter medium having a second thermoplastic resin including second constituent fibers and having a second melting temperature less than the first melting temperature, in a state in which the filter media are superposed on each other, the corrugation forming apparatus heats and presses the filter media at a softening temperature equal to or lower than the second melting temperature, the pressing being carried out such that the pressing of the second filter medium against the first filter medium crushes a weaving structure of the first fiber medium, the pressing further causes the second constituent fibers to become entangled with the first constituent fibers without closing gaps between the first constituent fibers, thereby corrugation-forming the filter media, and the filter media are thermally adhered to each other, and the thermally adhered filter media are frilly folded in a zigzag manner, and the corrugation formation in a concave and convex shape on a surface of the frilly folded filter media extends in a direction intersecting at right angle with a ridgeline direction of the frilly folded filter media.

2. The producing method of a laminated filter according to claim 1, wherein temperature of at least one of patterning portions of the corrugation forming apparatus is set to the lowest one of softening temperatures of the plurality of filter media.

3. The producing method of a laminated filter according to claim 1, wherein a softening temperature of at least one of the plurality of filter media is lower than the melting point thereof by 15° C. to 35° C.

4. The producing method of a laminated filter according to claim 2, wherein a softening temperature of at least one of the plurality of filter media is lower than the melting point thereof by 15° C. to 35° C.

5. The producing method of a laminated filter according to claim 1, wherein a difference between the melting point of the first filter medium and the melting point of the second filter medium is 10° C. or more.

* * * * *